(12) United States Patent
Ghosh et al.

(10) Patent No.: US 7,390,240 B2
(45) Date of Patent: Jun. 24, 2008

(54) METHOD OF SHAPING AND FORMING WORK MATERIALS

(75) Inventors: Ranajit Ghosh, Macungie, PA (US); Zbigniew Zurecki, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 11/250,587

(22) Filed: Oct. 14, 2005

(65) Prior Publication Data

US 2007/0087664 A1 Apr. 19, 2007

(51) Int. Cl.
*B24B 1/00* (2006.01)

(52) U.S. Cl. .............................. 451/7; 451/60; 451/446

(58) Field of Classification Search .................. 451/7, 451/53, 36, 60, 446, 28, 37, 54, 449, 450
See application file for complete search history.

(56) References Cited

U.S. PATENT DOCUMENTS

| | | | |
|---|---|---|---|
| 2,635,399 A | 4/1953 | West, Jr. |
| 2,641,047 A | 6/1953 | Jackamn et al. |
| 3,077,802 A | 2/1963 | Philip |
| 3,433,028 A | 3/1969 | Klee |
| 3,571,877 A | 3/1971 | Zerkel |
| 3,650,337 A | 3/1972 | Andrews et al. |
| 3,696,627 A | 10/1972 | Longsworth |
| 3,889,520 A | 6/1975 | Stoferle et al. |
| 3,900,975 A | 8/1975 | Lightstone et al. |
| 3,971,114 A | 7/1976 | Dudley |
| 3,979,981 A | 9/1976 | Lightstone et al. |
| 4,083,220 A | 4/1978 | Kobayashi et al. |
| 4,296,610 A | 10/1981 | Davis |
| 4,336,689 A | 6/1982 | Davis |
| 4,404,827 A | 9/1983 | Van den Sype |
| 4,510,760 A | 4/1985 | Wieland |
| 4,547,470 A | 10/1985 | Tanase et al. |
| 4,666,665 A | 5/1987 | Hornsby et al. |

(Continued)

FOREIGN PATENT DOCUMENTS

CN     87 1 02713 A     4/1988

(Continued)

OTHER PUBLICATIONS

Hong, Shane Y., et al., Micro-temperature Manipulation in Cryogenic Machining of Low Carbon Steel, Elsevier Journal of Materials Proceessing Technology 116 (2001) pp. 22-30.

(Continued)

*Primary Examiner*—Dung Van Nguyen
(74) *Attorney, Agent, or Firm*—Anne B. Kiernan (57) ABSTRACT

Method of processing a workpiece comprising (a) providing a tool and a workpiece, wherein the workpiece has an initial shape; (b) placing the workpiece and the tool in contact to form an interface, applying force to the tool and/or the workpiece, and moving the tool and/or the workpiece to effect a change in the initial shape of the workpiece; (c) applying a lubricant to any area on a surface of the tool and/or to any area on a surface of the workpiece while the workpiece and the tool are in contact; and (d) applying a cryogenic fluid to any area on the surface of the tool and/or to any area on the surface of the workpiece while the workpiece and the tool are in contact.

23 Claims, 3 Drawing Sheets

U.S. PATENT DOCUMENTS

| | | | |
|---|---|---|---|
| 4,715,187 | A | 12/1987 | Stearns |
| 4,716,738 | A | 1/1988 | Tatge et al. |
| 4,788,842 | A | 12/1988 | Kopp et al. |
| 4,829,859 | A | 5/1989 | Yankoff |
| 4,829,869 | A | 5/1989 | Katada et al. |
| 4,844,047 | A | 7/1989 | Brehm et al. |
| 4,848,198 | A | 7/1989 | Royal et al. |
| 5,025,547 | A | 6/1991 | Sheu et al. |
| 5,103,701 | A | 4/1992 | Lundin et al. |
| 5,123,250 | A | 6/1992 | Maric |
| 5,237,894 | A | 8/1993 | Lindeke |
| 5,265,505 | A | 11/1993 | Frechette |
| 5,392,608 | A | 2/1995 | Lee |
| 5,432,132 | A | 7/1995 | Dasgupta et al. |
| 5,449,647 | A | 9/1995 | Brandt |
| 5,477,691 | A | 12/1995 | White |
| 5,509,335 | A | 4/1996 | Emerson et al. |
| 5,597,272 | A | 1/1997 | Moriguchi et al. |
| 5,716,974 | A | 2/1998 | Camaggi et al. |
| 5,738,281 | A | 4/1998 | Zurecki et al. |
| 5,761,941 | A | 6/1998 | Matsui et al. |
| 5,761,974 | A | 6/1998 | Wang et al. |
| 5,799,553 | A | 9/1998 | Billatos |
| 5,862,833 | A | 1/1999 | Perez |
| 5,901,623 | A | 5/1999 | Hong |
| 6,010,283 | A | 1/2000 | Henrich et al. |
| 6,017,172 | A | 1/2000 | Ukegawa et al. |
| 6,053,669 | A | 4/2000 | Lagerberg |
| 6,105,374 | A | 8/2000 | Kamody |
| 6,179,692 | B1 | 1/2001 | Hara |
| 6,200,198 | B1 | 3/2001 | Ukai et al. |
| 6,202,525 | B1 | 3/2001 | Hendrickson et al. |
| 6,305,183 | B1 | 10/2001 | Mukai et al. |
| 6,330,818 | B1 | 12/2001 | Jain |
| 6,332,385 | B1 | 12/2001 | Kautto et al. |
| 6,360,577 | B2 | 3/2002 | Austin |
| 6,513,336 | B2 | 2/2003 | Zurecki et al. |
| 6,564,682 | B1 | 5/2003 | Zurecki et al. |
| 6,652,200 | B2 | 11/2003 | Kraemer |
| 6,675,622 | B2 | 1/2004 | Plicht et al. |
| 6,815,362 | B1 | 11/2004 | Wong et al. |
| 6,874,344 | B1 | 4/2005 | Junius et al. |
| 2002/0040905 | A1 | 4/2002 | Groll |
| 2002/0150496 | A1 | 10/2002 | Chandrasekar et al. |
| 2002/0189413 | A1 | 12/2002 | Zurecki, et al. |
| 2004/0043626 | A1 | 3/2003 | Chou San et al. |
| 2003/0110781 | A1 | 6/2003 | Zurecki et al. |
| 2004/0154443 | A1 | 8/2004 | Zurecki et al. |
| 2004/0232258 | A1 | 11/2004 | Cerv et al. |
| 2004/0234350 | A1* | 11/2004 | Jager et al. ............... 409/136 |
| 2004/0237542 | A1 | 12/2004 | Zurecki et al. |
| 2005/0011201 | A1 | 1/2005 | Zurecki et al. |
| 2005/0016337 | A1 | 1/2005 | Zurecki et al. |
| 2005/0211029 | A1 | 9/2005 | Zurechi et al. |
| 2007/0175255 | A1 | 8/2007 | Hartmut et al. |

FOREIGN PATENT DOCUMENTS

| | | |
|---|---|---|
| DE | 196 00 172 C2 | 12/1997 |
| DE | 43 26 517 C2 | 6/1998 |
| DE | 197 30 539 C1 | 4/1999 |
| EP | 0 842 722 A1 | 5/1998 |
| EP | 0 711 663 B1 | 7/1999 |
| EP | 1 580 284 A2 | 9/2005 |
| EP | 0 945 222 B1 | 11/2005 |
| EP | 1 637 257 A1 | 3/2006 |
| FR | 2 724 337 A1 | 3/1996 |
| JP | 32-8397 | 9/1957 |
| JP | 62-10105 A | 1/1987 |
| JP | 63-62637 B2 | 12/1988 |
| JP | 06-031502 A | 2/1994 |
| JP | 6330077 A2 | 11/1994 |
| JP | 09-300172 A | 11/1997 |
| JP | 11-156669 A | 6/1999 |
| JP | 11-320328 A | 11/1999 |
| JP | 2000-65291 A | 3/2000 |
| JP | 2000-296438 A | 10/2000 |
| JP | 2002-059336 A | 2/2002 |
| WO | 92/16464 A1 | 10/1992 |
| WO | 97/08486 A1 | 3/1997 |
| WO | 98/10893 A1 | 3/1998 |
| WO | 99/60079 A2 | 11/1999 |
| WO | 02/096598 A1 | 12/2002 |
| WO | 03/002277 A1 | 1/2003 |
| WO | 03/022517 A2 | 3/2003 |
| WO | 03/066916 A2 | 8/2003 |
| WO | 2005/120739 A1 | 12/2005 |

OTHER PUBLICATIONS

Chang-Xue (Jack) Feng; "An Experimental Study of the Impact of Turning Parameters on Surface Roughness";Paper No. 2036; Proceedings of the 2001 Industrial Engineering Research Confrence; pp. 1-9.

Mehrotra, P.K.; "Applications of Ceramic Cutting Tools"; Key Engineering Materials; Trans Tech Publications, Switzerland; 1998; vol. 138-140; pp.1-24.

Dewes, R.C., et al; "The Use of High Speed Machining for the Manufacture of Hardened Steel Dies"; Trans. NAMRI/SME; 1996; pp. 21-26.

Huang, J.Y., et al; "Microstructure of Cryogenic Treated M2 Tool Steel"; Materials Science and Engineering A339; Los Alamos, NM; pp. 241-244.

Ozel, T., et al; "Effects of Cutting Edge Geometry, Workpiece Hardness, Feed Rate and Cutting Speed on Surface Roughness and Forces in Finish Turning of Hardened AISI H13 Steel"; International Journal of Advanced Manufacturing Technology; Piscataway, New Jersey; 2003; pp. 1-33.

Thiele, J.D., et al; "Effect of Cutting Edge Geometry and Workpiece Hardness on Surface Generation in the Finish Hard Turning of AISI 52100 Steel"; Journal of Materials Processing Technology 94; 1999; pp. 216-226.

Zurecki, Z., et al; "Industrial Systems for Cost Effective Machining of Metals Using an Environmentally Friendly Liquid Nitrogen Coolant"; Aerospace Mfg. Tech Conf; June 2-4, 1998; Paper No. 981,865.

Zurecki, Z., et al; "Dry Machining of Metals with Liquid Nitrogen"; 3rd Intl. Machining & Grinding '99 Conference and Exposition; Oct. 4-7, 1999; Cincinnati, OH; pp. 1-26.

Lin, J., et al; "Estimation of Cutting Temperature in High Speed Machining"; Trans. of the ASME; vol. 114; Jul. 1992; pp. 290-296.

Chou, Y.K., et al; "Process Effects on White Layer Formation in Hard Turning"; NAMRI/SME; 1998; vol. XXVI; pp. 117-122.

Broskea; "PCBN Tool Failure Mechanism Analysis"; Intertech; Jul. 17-21, 2000.

Kitagawa, T., et al; "Temperature and wear of cutting in high-speed machining of inconel 718 and Ti6Al-6V-2Sn"; Wear 202; 1997; Elsevier; pp. 142-148.

"Heat Transfer in Cutting Inserts", Kabala Andrze, Experimental Stress Analysis 2001.

"White Layer Formation at Machined Surfaces and . . . ," B. J. Griffins, J. of Tribology, vol. 107/165, Apr. 1985.

"Machining Hard Materials with Geometrically . . . ," W. Konig, et al, Annals of CIRP, vol. 57, 1990.

E. M. and P. K. Wright, "Metal Cutting", 4th Ed., Butterwoth, Boston, Oxford, 2000.

ASM Handbook, 9th Ed. vol. 16, "Machining Ceramic Materials," 1995.

"Potential and Limitations of Hard Turning . . . ," H. K. Tonshoff, et al, 1st Int. Machining and Grinding Conf. 1995.

Orlowicz, et al., "Effect of Rapid Solidification on Sliding Wear of Iron Castings", Wear 254 (2003), pp. 154-163.

J. Y. Huang, et al. "Microstructure of Cryogenic Treated M2 tool Steel," Materials Science and Engineering A339 (2003) 241-244.

"Machining Data Handbook," 3rd Edition, vol. 1 and 2, Machinability DataCenter, IAMS, Inc. 1980.

"Application of Metal Cutting Theory," F. E. Gorczyca, Industrial Press, New York, 1987.

"Analysis of Material Removal Processes," W. R. DeVries, Springer Texts in Mechanical Eng., Springer-Verlag, 1992.

ASM Specialty Handbook, "Tool Materials," Ed. J. R. Davis, 1998.

"Microstructural Effects in Precision Hard Turning," Y. K. Chou; C. J. Evans, MED-vol. 4, Mfg. Sci. and Engr., ASME 1996.

F. Gunnberg, "Surface Integrity Generated by Hard Turning" Thesis. Dept. of Product Development, Chalmers University of Technology, Goteberg, Sweden, 2003.

"The Lindenfrost phenomenon", F. L. Curzon, Am. J. Phys., 46 (8), Aug. 1978, pp. 825-828.

"A boiling heat transfer paradox", G. G. Lavalle et al., Am. J. Phys., vol. 60, No. 7, Jul. 1992, pp. 593-597.

"Cooling by immersion in liquid nitrogen", T. W. Listerman et al., Am. J. Phys., 54 (6), Jun. '86, pp. 554-558.

"An Analytical Method to Determine the Liquid Film Thickness Produced by Gas Atomized Sprays", J. Yang et al., J. of Heat Transfer, Feb. 1996, vol. 118, pp. 255-258.

"Optimizing and Predicting Critical Heat Flux in Spray Cooling of a Square Surface", I. Mudawar and K. A. Estes, J. of Heat Transfer, Aug. 1996, vol. 118, pp. 672-679.

"Film Boiling Under an Impinging Cryogenic Jet", R. F. Barron and R. S. Stanley, Advances in Cryogenic Engineering, vol. 39, Ed. P. Kittel, Plenum Press, New York, 1994, pp. 1769-1777.

"CRC Materials Sci. & Engineering Handbook," 2nd Edition, CRC Press, 1994, Edited by J. F. Shackelford et al.

"Transport Phenomena" R. R. Bird et al., John Wiley & Sons, 1960.

Biomedical Instrumentation and Tech., "Development of a High-Performance Multiprobe Cryosurgical Device", Chang, et al, 1994.

* cited by examiner

METHOD OF SHAPING AND FORMING WORK MATERIALS

BACKGROUND OF THE INVENTION

The configuration of a solid material workpiece can be altered by processes in which material is removed from the workpiece, in which the workpiece is separated into multiple pieces with or without the removal of material, or in which the shape of the workpiece is altered without any significant material removal. Exemplary shaping processes include, for example, machining/turning, grinding, drilling, tapping, sawing, milling, and planing. In these shaping processes, material is removed from the workpiece during the process. In a forming process, the shape, thickness, diameter, or any other physical configuration of the workpiece is altered without any significant material removal, or the workpiece is separated into multiple pieces without any significant material removal. Forming processes include, for example, extruding, stamping, profiling, bending, slitting, shearing, drawing, and punching. Any of these processes can be applied to solid metallic or non-metallic materials.

Shaping and forming processes are characterized by forcible contact of a tool with the workpiece in which the tool deforms the workpiece. In the process, external heat is generated by surface friction between the tool and the workpiece, and internal heat is generated by deformation of the workpiece material. In order to prevent overheating of the tool and workpiece, a coolant or a combined lubricant/coolant fluid such as a water-oil emulsion can be applied to the tool and/or workpiece. The cooling and lubrication properties of a coolant/lubricant fluid are critical in decreasing tool wear and extending tool life. Cooling and lubrication also are important in achieving the desired size, finish, and shape of the workpiece. A secondary function of the coolant/lubricant may be to flush away chips and metal fines from the tool/workpiece interface to prevent marring of the finished surface. Various additives and sufactants can be added to the coolant and lubricant fluids to enhance performance. In certain applications, particularly metalworking applications, cryogenic fluids are used to provide effective cooling.

These processes have been well-developed and are widely used on metals, plastics, and other materials in various manufacturing industries. While the art of shaping and forming of materials is well-developed, there remains a need for further innovation and improvements in shaping and forming processes. This need is addressed by the embodiments of the present invention as described below and defined by the claims that follow.

BRIEF SUMMARY OF THE INVENTION

An embodiment of the invention relates to a method of processing a workpiece comprising (a) providing a tool and a workpiece, wherein the workpiece has an initial shape; (b) placing the workpiece and the tool in contact to form an interface, applying force to the tool and/or the workpiece, and moving the tool and/or the workpiece to effect a change in the initial shape of the workpiece; (c) applying a lubricant to any area on a surface of the tool and/or to any area on a surface of the workpiece while the workpiece and the tool are in contact; and (d) applying a cryogenic fluid to any area on the surface of the tool and/or to any area on the surface of the workpiece while the workpiece and the tool are in contact.

Any area to which the lubricant is applied may not be contiguous with or overlapping with any area to which the cryogenic fluid is applied, i.e., the lubricant and cryogenic fluid may be applied to different areas. Alternatively, the lubricant may be applied to at least a portion of an area during a time period, and, prior to or subsequent to the time period, the cryogenic fluid may be applied to at least a portion of that area.

The lubricant may be a liquid and the lubricant may be applied to at least a portion of a selected area on the workpiece. The cryogenic fluid may be applied to at least a portion of the selected area during a time period and, prior to or subsequent to that time period, the lubricant may be applied to at least a portion of the selected area.

The interface may be characterized by a leading edge of the tool at which initial contact is made between the tool and the workpiece and by a trailing edge of the tool at which contact between the tool and the workpiece is terminated. The workpiece may be characterized by a first workpiece area adjacent the leading edge of the tool, a second workpiece area adjacent the trailing edge of the tool, a third workpiece area adjacent the first area, and a fourth workpiece area adjacent the second workpiece area; and the tool may be characterized by a first tool area adjacent the leading edge of the tool, a second tool area adjacent the trailing edge of the tool, and any area of the tool other than the first and second tool areas.

In this embodiment,
(1) the lubricant may be applied to the first tool area, and the cryogenic fluid may be applied to any area on the tool other than the first and second tool areas; or
(2) the lubricant may be applied to the first workpiece area, and the cryogenic fluid may be applied to any area on the tool other than the first and second tool areas; or
(3) the lubricant may be applied to the first workpiece area and the first tool area, and the cryogenic fluid may be applied to the second workpiece area and to any area on the tool other than the first and second tool areas; or
(4) the lubricant may be applied to the first workpiece area and the first tool area, and the cryogenic fluid may be applied to the third workpiece area; or
(5) the lubricant may be applied to the first and second tool areas and to the first and second workpiece areas, and the cryogenic fluid may be applied to any area on the tool other than the first and second tool areas; or
(6) the lubricant may be applied to the third workpiece area, and the cryogenic fluid may be applied to the first tool area and to any area on the tool other than the first and second tool areas; or
(7) the lubricant may be applied to any area on the tool other than the first and second tool areas, and the cryogenic fluid may be applied to the first and second tool areas and to the first and second workpiece areas; or
(8) the lubricant may be applied to the third workpiece area, and the cryogenic fluid may be applied to the first tool area and to the first workpiece area.

The cryogenic fluid may be selected from the group consisting of nitrogen, argon, carbon dioxide, and mixtures thereof. The lubricant may be a liquid lubricant and may comprise one or more components selected from the group consisting of vegetable oils, mineral oils, and hydrocarbon-free lubricants. The lubricant may be a solid lubricant and may be selected from the group consisting of paraffin wax, pumpable greases, and flowable non-liquid materials.

The surface of the workpiece prior to contact with the tool may be characterized by an initial value of a roughness average Ra. The lubricant may be applied to the workpiece in a layer having an equivalent thickness of between about 0.1 and about 10 times the initial value of the roughness average Ra, inclusive. The lubricant may have a viscosity of less than about 40 Cst at 40° C. Advantageously, the lubricant may have a viscosity of less than about 20 Cst at 40° C. The lubricant may be applied to any area on the tool other than the first and second tool areas, and the cryogenic fluid may be applied to the first and second tool areas and to the first and second workpiece areas. The lubricant may be applied to the workpiece in a layer having an equivalent thickness of between about 0.1 and about 10 times the initial value of the roughness average Ra, inclusive.

The workpiece may comprise metal having a hardness of less than about 50 Rockwell C and possibly less than about 35 Rockwell C. Alternatively, the workpiece may comprise a material selected from the group consisting of composite materials, plastics, refractory materials, and ceramics. The method of processing the workpiece may be selected from shaping and forming processes in the group consisting of machining, turning, grinding, slitting, shearing, extruding, stamping, profiling, bending, drawing, drilling, punching, planing, tapping, and sawing.

Another embodiment of the invention includes a method of processing a workpiece comprising
  (a) providing a tool and a workpiece, wherein the workpiece has an initial shape and is characterized by an initial value of a roughness average Ra;
  (b) placing the workpiece and the tool in contact to form an interface, applying force to the tool and/or the workpiece, and moving the tool and/or the workpiece to effect a change in the initial shape of the workpiece;
  (c) applying a liquid lubricant to any area on a surface of the workpiece while the workpiece and the tool are in contact, wherein the lubricant is applied to the workpiece in a layer having an equivalent thickness of between about 0.1 and about 10 times the initial value of the roughness average Ra, inclusive; and
  (d) applying a cryogenic fluid to any area on the surface of the tool and/or to any area on the surface of the workpiece while the workpiece and the tool are in contact.

The lubricant may be a liquid lubricant and may comprise one or more components selected from the group consisting of vegetable oils, mineral oils, and hydrocarbon-free lubricants. The lubricant may have a viscosity of less than about 40 Cst at 40° C. and may have a viscosity of less than about 20 Cst at 40° C.

An alternative embodiment of the invention relates to a shaped article made by a method comprising
  (a) providing a tool and a workpiece, wherein the workpiece has an initial shape;
  (b) placing the workpiece and the tool in contact to form an interface, applying force to the tool and/or the workpiece, and moving the tool and/or the workpiece to effect a change in the initial shape of the workpiece;
  (c) applying a lubricant to any area on a surface of the tool and/or to any area on a surface of the workpiece while the workpiece and the tool are in contact;
  (d) applying a cryogenic fluid to any area on the surface of the tool and/or to any area on the surface of the workpiece while the workpiece and the tool are in contact; and
  (e) forming the workpiece into a final shape to provide the shaped article.

In another alternative embodiment, the invention includes a shaped article made by a method comprising
  (a) providing a tool and a workpiece, wherein the workpiece has an initial shape and is characterized by an initial value of a roughness average Ra;
  (b) placing the workpiece and the tool in contact to form an interface, applying force to the tool and/or the workpiece, and moving the tool and/or the workpiece to effect a change in the initial shape of the workpiece;
  (c) applying a liquid lubricant to any area on a surface of the workpiece while the workpiece and the tool are in contact, wherein the lubricant is applied to the workpiece in a layer having an equivalent thickness of between about 0.1 and about 10 times the initial value of the roughness average Ra, inclusive;
  (d) applying a cryogenic fluid to any area on the surface of the tool and/or to any area on the surface of the workpiece while the workpiece and the tool are in contact; and
  (e) forming the workpiece into a final shape to provide the shaped article.

A related embodiment of the invention includes an apparatus for processing a workpiece comprising
  (a) a tool and a workpiece, wherein the workpiece has an initial shape;
  (b) means for placing the workpiece and the tool in contact to form an interface, means for applying force to the tool and/or the workpiece, and means for moving the tool and/or the workpiece to effect a change in the initial shape of the workpiece;
  (c) a lubricant application system adapted for applying a lubricant to any area on a surface of the tool and/or to any area on a surface of the workpiece while the workpiece and the tool are in contact; and
  (d) a cryogenic fluid application system adapted for applying a cryogenic fluid to any area on the surface of the tool and/or to any area on the surface of the workpiece while the workpiece and the tool are in contact.

The apparatus may be selected from shaping and forming systems in the group consisting of machining, turning, grinding, slitting, shearing, extruding, stamping, profiling, bending, drawing, drilling, punching, planing, tapping, and sawing.

DETAILED DESCRIPTION OF THE INVENTION

The embodiments of the present invention utilize a combination of a lubricant and a cryogenic fluid to provide lubrication and cooling in shaping and forming processes. The use of these lubricating and cryogenic cooling functions allows better performance of the shaping or forming process and reduces or eliminates the amount of spent coolant fluid used in conventional processes. The lubricant may be a liquid or a solid at ambient temperatures; the lubricant may be essentially water-free or may contain water. In some embodiments, the lubricant and the cryogenic fluid may be applied on different areas of the tool and/or workpiece such that the areas of application of the cryogenic fluid and the lubricant are not contiguous or do not overlap, i.e., do not cover any of the same area. In other embodiments, the lubricant may be applied to at least a portion of an area on the tool or workpiece during a time period, and, prior to or subsequent to that time period, the cryogenic fluid may be applied to at least a portion of that area. Proper selection of the time periods should allow the lubricant to penetrate and/or fill the microscopic regions formed by the surface asperities before the lubricant freezes, and should not cause the lubricant to freeze before it can penetrate and/or fill the microscopic regions formed by the surface asperities.

In the present disclosure, the term "cryogenic fluid" means a gas, a liquid, solid particles, or any mixture thereof at temperatures below about −100° C. Exemplary cryogenic fluids for use in embodiments of the present invention may comprise, for example, nitrogen, argon, carbon dioxide, or mixtures thereof. A lubricant is defined as any of various oily liquids and/or greasy solids that reduce friction, heat, and wear when applied to parts that are in moveable contact. The lubricant may be essentially water-free, or alternatively may contain water.

The terms "apply", "applying", or "applied" as used for a cryogenic fluid mean spraying, jetting, or otherwise directing the fluid to contact and cool any external surface of a tool and/or workpiece while the workpiece and the tool are in contact. The terms "apply", "applying", or "applied" as used for a liquid lubricant mean spraying, jetting, flooding, misting, or otherwise directing the lubricant to contact the surface of a tool or workpiece and to penetrate and/or fill the microscopic regions formed by the surface asperities on the tool and/or workpiece. The terms "apply", "applying", or "applied" as used for a solid lubricant mean pressing, rubbing, smearing, or otherwise directing the solid lubricant to contact the surface of a tool or workpiece and to penetrate and/or fill the microscopic regions formed by the surface asperities on the tool and/or workpiece.

The term "surface" as used in reference to a tool or a workpiece means any external surface of the tool or workpiece. The term "area" as used in reference to a tool or a workpiece refers to a region on any external surface of the tool or workpiece.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

Figure 1:
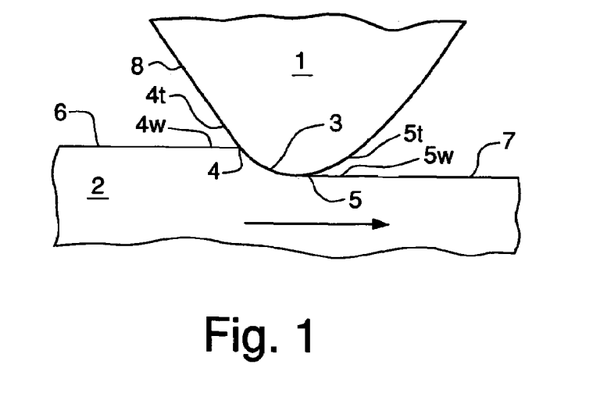
FIG. 1 is a schematic diagram of the generic spatial relationship of a tool to a workpiece.

A schematic diagram of the genetic spatial relationship of a tool to a workpiece is illustrated in FIG. 1. Tool 1 and workpiece 2 are placed in forcible contact to form interface 3. The tool and/or the workpiece are moved to effect a change in the shape of the workpiece. While either or both of the tool and the workpiece can move, the relative movement of the workpiece relative to the tool is shown for illustration purposes by the exemplary arrow on workpiece 2. Interface 3 is characterized by tool leading edge 4 at which initial contact is made between the tool and the workpiece and tool trailing edge 5 at which contact between the tool and the workpiece is terminated.

The workpiece may be characterized by first area 4w adjacent the leading edge of the tool, second area 5w adjacent the trailing edge of the tool, third area 6 adjacent first area 4w, and fourth area 7 adjacent second area 5w. First area 4w on the workpiece is a small area adjacent tool leading edge 4 and second area 5w is a small area adjacent tool trailing edge 5. The tool may be characterized by first area 4t adjacent tool leading edge 4, second area 5t adjacent tool trailing edge 5, and any remaining area or areas 8 of the tool excluding first and second areas 4t and 5t. First area 4t on the tool is a small area adjacent tool leading edge 4 and second area 5t is a small area adjacent tool trailing edge 5.

The lubricant may be applied to any area on a surface of the tool and/or to any area on a surface of the workpiece, and the cryogenic fluid may be applied to any area on the surface of the tool and/or to any area on the surface of the workpiece, while the workpiece and the tool are in contact.

A specific combination of the locations for application of the cryogenic fluid and the lubricant may be selected for each shaping and forming process. A number of exemplary combinations of locations for applying the cryogenic fluid and lubricant are given in Table 1. These combinations are illustrative only, and other combinations may be envisioned for other shaping and forming applications.

TABLE 1

Exemplary Locations for Application of Lubricant and Cryogenic Fluid (locations refer to FIG. 1)

| Embodiment | Cryogenic Fluid | Coolant | Typical Process Application |
| --- | --- | --- | --- |
| 1 | 8 | 4t | machining/turning; milling |
| 2 | 8 | 4w | machining/turning; milling |
| 3 | 8 + 5w | 4t + 4w | machining/turning; milling |
| 4 | 6 | 4t + 4w | machining/turning; milling |
| 5 | 8 | 4t + 4w + 5t + 5w | machining/turning; milling |
| 6 | 8 + 4t | 6 | machining/turning; milling |
| 7 | 4t + 4w + 5t + 5w | 8 | grinding; milling; drilling |
| 8 | 4t + 4w | 6 | machining/turning |

Figure 2:
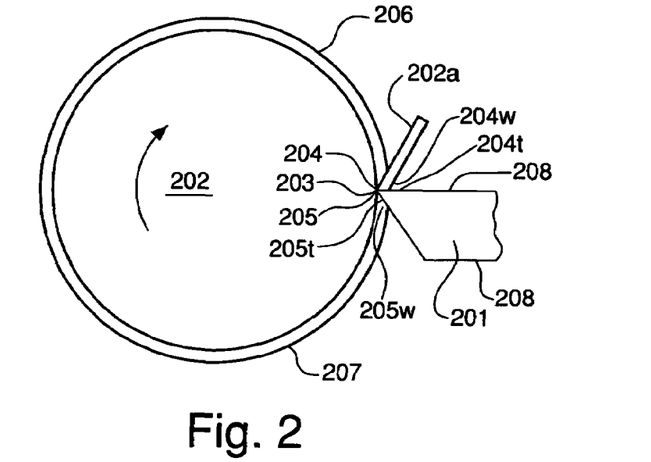
FIG. 2 is a schematic diagram of a machining or turning process.

The process of machining/turning is shown in the schematic diagram of FIG. 2 to illustrate an exemplary embodiment of the invention. In this process, tool 201 is pressed against rotating workpiece 202 at interface 203 as commonly practiced in the art to remove turning or chip material 202a. Interface 203 is bounded by tool leading edge 204 and tool trailing edge 205. Workpiece 202 is characterized by first area 204w adjacent the leading edge of the tool, second area 205w adjacent the trailing edge of the tool, third area 206 adjacent first area 204w, and fourth area 207 adjacent second area 205w. First area 204w on the workpiece is a small area adjacent tool leading edge 204 and second area 205w is a small area on the tool adjacent tool trailing edge 205. The tool may be characterized by first area 204t adjacent tool leading edge 204, second area 205t adjacent tool trailing edge 205, and any remaining area or areas 208 of the tool excluding areas 204t and 205t. First area 204t on the tool is a small area adjacent tool leading edge 204 and second area 205t is a small area adjacent tool trailing edge 205.

Embodiments 1–6 and 8 of Table 1 describe various combinations of the locations at which the cryogenic fluid and lubricant may be applied in FIG. 1. In one example referring to FIG. 2, the cryogenic fluid is applied at 208 on tool 201, and the lubricant is applied at 204t. In a second example, the cryogenic fluid is applied at 208 on tool 201, and the lubricant is applied at 204w. In a third example, the cryogenic fluid is applied at 208 and 205w, and the lubricant is applied at 204w and 204t. In a fourth example, the cryogenic fluid is applied at 206, and the lubricant is applied at 204w and 204t. In a fifth example, the cryogenic fluid is applied at 208, and the lubricant is applied at 204w, 204t, 205w, and 205t. In a sixth example, the cryogenic fluid is applied at 208 and 204t, and the lubricant is applied at 206. In a final example, the cryogenic fluid is applied at 204t and 204w, and the lubricant is applied at 206.

Figure 3:
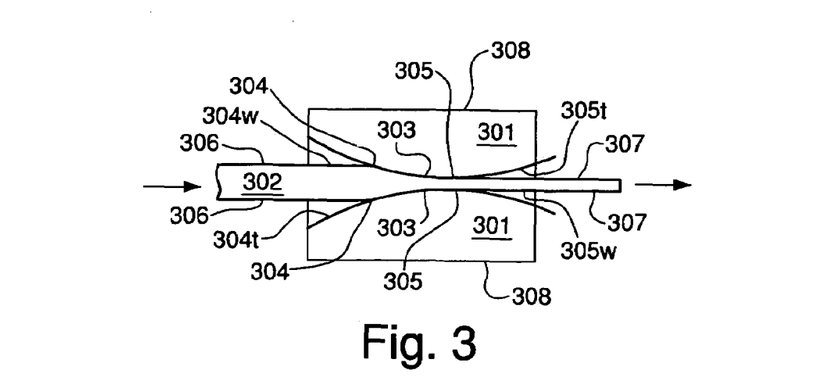
FIG. 3 is a schematic diagram of a drawing or extruding process.

The process of drawing is shown in the schematic diagram of FIG. 3 to illustrate an exemplary embodiment of the invention. In this process, workpiece 302 is directed through die tool 301 as commonly practiced in the art to reduce the diameter of the workpiece. Interface 303 is bounded by tool leading edge 304 and tool trailing edge 305. Workpiece 302 is characterized by first area 304w adjacent the leading edge of the tool, second area 305w adjacent the trailing edge of the tool, third area 306 adjacent first area 304w, and fourth area 307 adjacent second area 305w. The die tool may be characterized by first area 304t adjacent tool leading edge 304, second area 305t adjacent tool trailing edge 305, and any remaining area or areas 308 of the tool excluding areas 304t and 305t. First areas 304t on the tool is a small area adjacent tool leading edge 304 and second area 305t is a small area on the tool adjacent tool trailing edge 305. First area 304w on the workpiece is a small area adjacent tool leading edge 304 and second area 305w is a small area on the workpiece adjacent tool trailing edge 305.

In the embodiments relating to FIG. 3, the lubricant may be applied, for example, at 306 on the workpiece and the cryogenic fluid may be applied at 308 on the tool and optionally at 307 on the workpiece.

Figure 4:
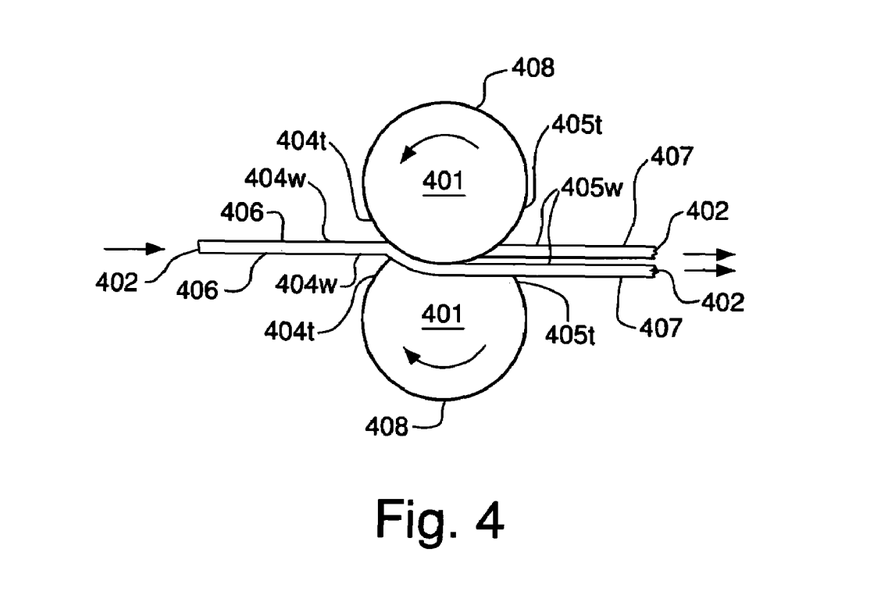
FIG. 4 is a schematic diagram of a slitting or shearing process.

The process of slitting or shearing is shown in the schematic diagram of FIG. 4 to illustrate another exemplary embodiment of the invention. In this process, seen here in side view, workpiece 402 is directed through cutting wheels 401 as commonly practiced in the art to cut the feed workpiece into two pieces. The interface between the cutting wheels and the workpiece as well as the leading and trailing edges of the tool are hidden in FIG. 4, but other features can be seen. Workpiece 402 may be characterized by first area 404w adjacent the leading edge of the tool, second area 405w adjacent the trailing edge of the tool, third area 406 adjacent first area 404w, and fourth areas 407 adjacent second areas 405w. The tool may be characterized by first areas 404t adjacent the tool leading edge, second areas 405t adjacent the tool trailing edge, and any remaining area or areas 408 of the tool wheels excluding areas 404t and 405t. First area 404w on the workpiece is a small area adjacent the tool leading edge and second area 405w is a small area on the workpiece adjacent the tool trailing edge. First area 404t on the tool is a small area adjacent the tool leading edge and second area 405t is a small area adjacent the tool trailing edge.

In the embodiments relating to FIG. 4, the lubricant may be applied to the workpiece at 404w and the cryogenic fluid may be applied to the tool at 405t and/or 404t.

Figure 5:
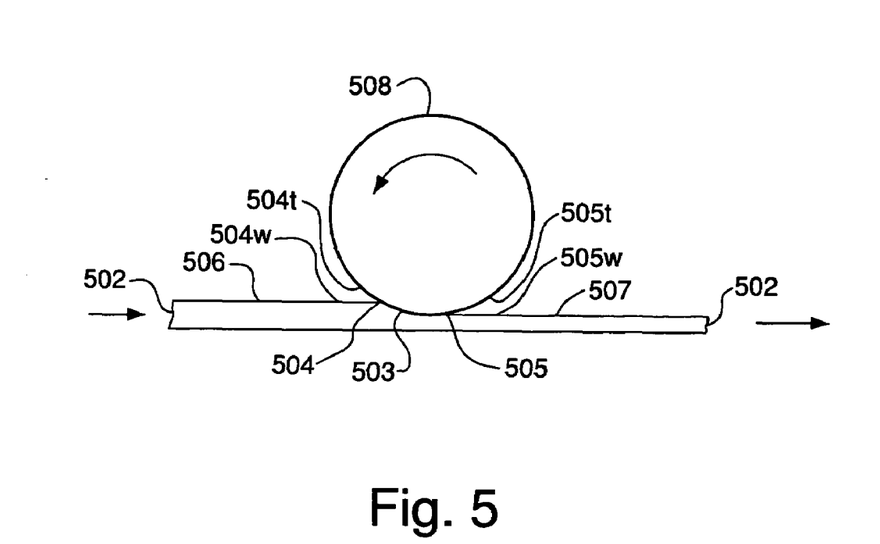
FIG. 5 is a schematic diagram of a grinding process.

The process of grinding is shown in the schematic diagram of FIG. 5 to illustrate another exemplary embodiment of the invention. In this process, workpiece 502 is directed past grinding wheel 508 as commonly practiced in the art to remove material from the top surface of the feed end of workpiece 502. Interface 503 is bounded by tool leading edge 504 and tool trailing edge 505. Workpiece 502 is characterized by first area 504w adjacent the leading edge of the tool, second area 505w adjacent the trailing edge of the tool, third area 506 adjacent first area 504w, and fourth area 507 adjacent second area 505w. The tool may be characterized by first area 504t adjacent the tool leading edge, second area 505t adjacent the tool trailing edge, and any remaining area or areas 508 of the tool wheel excluding areas 504t and 505t. First area 504t on the tool is a small area adjacent tool leading edge 504 and second area 505t is a small area on the tool adjacent tool trailing edge 505. First area 504w on the workpiece is a small area adjacent tool leading edge 504 and second area 505w is a small area on the workpiece adjacent tool trailing edge 505.

In an embodiment relating to FIG. 5, the cryogenic fluid may be applied to areas 504t and 504w, and optionally also to areas 505t and 505w. The lubricant, which in this case may be a solid lubricant such as paraffin wax, is applied to any part of area 508 on the tool wheel.

The cryogenic fluid may be applied to the desired surface by spraying, jetting, or otherwise directing the fluid to contact and cool the surface of a tool. Any method known in the art may be used, and exemplary methods are described in U.S. Pat. Nos. 6,513,336 B2, 6,564,682 B1, and U.S. Pat. No. 6,675,622 B2 and in U.S. Patent Publications 20040237542 A1, 20050211029 A1, 20050016337 A1, 20050011201 A1, and 20040154443 A1, all of which are fully incorporated herein by reference.

The lubricant should be applied in minimal amounts sufficient to wet or penetrate the workpiece surface and/or tool surface and fill in the regions between the asperities on the surface while the lubricant is being applied to the workpiece and/or tool. The lubricant may be advantageously applied in an amount sufficient to form a layer on the workpiece having an equivalent thickness of between about 0.1 and about 10 times the initial value of the roughness average Ra, inclusive. The roughness average Ra is a standard surface parameter in the field of metrology and topology that characterizes the average of the peak and valley distances measured along a mean line parallel to the surface direction. Standard definitions of the roughness average Ra are given, for example, by ISO 4287/1-1997 and ASME B46.1-2002.

Because the layer on the surface of the workpiece and/or tool fills the regions formed by the surface asperities, the layer varies in thickness at the microscopic level. In order to quantify the amount of lubricant applied, the term "equivalent thickness" is used above and refers to a hypothetical layer having essentially parallel surfaces parallel to the tool and/or workpiece surface and having an essentially constant thickness defined as some multiple of the initial value of the roughness average Ra. The actual amount or volume of lubricant applied to a workpiece then is determined by the equivalent thickness and the area to which the lubricant is applied. The actual amount or volume of lubricant applied to a workpiece and/or tool per unit time is determined by the equivalent thickness and the area to which the lubricant is applied per unit time.

Liquid lubricants (i.e., liquid at ambient temperature) may be applied by any known method of spraying, jetting, flooding, misting, dripping, or otherwise directing the lubricant to contact the surface of the tool or workpiece and to penetrate and/or fill the microscopic regions formed by the surface asperities. The liquid lubricant should have a sufficiently low viscosity and a sufficiently low wetting angle so that the lubricant can rapidly penetrate and fill the microscopic regions formed by the surface asperities of the workpiece. The liquid lubricant may have a viscosity of less than about 40 Cst at 40° C. and possibly even less than about 20 Cst at 40° C. The wetting angle of the lubricant on the workpiece may be in the range between zero degrees and about 90 degrees, and is most advantageously between zero degrees and about 60 degrees.

When the liquid lubricant and the cryogenic fluid are applied sequentially to a common area on the workpiece or tool, the lubricant should reach the surface in the liquid state and penetrate, wet, and fill the microscopic regions formed by the surface asperities before the liquid freezes. This may be effected in one of several exemplary ways. In one embodiment, the lubricant may be applied to an area at ambient temperature and, after a sufficient time period to allow wetting and penetration of the microscopic regions formed by the surface asperities by the lubricant (typically on the order of seconds or fraction of a second), the cryogenic fluid is applied to at least a portion of the area. Application of the cryogenic fluid then cools the surface and freezes the previously-applied lubricant. In another embodiment, the lubricant is applied to a previously-cooled area on the surface to penetrate and fill the microscopic regions formed by the surface asperities before the liquid freezes. In yet another embodiment, the lubricant and the cryogenic fluid may be applied to different areas such that the area to which the lubricant is applied is cooled indirectly by conduction from the area to the location at which the cryogenic fluid is applied. Other embodiments may be possible in which some or all of the lubricant is not frozen prior to contact of the tool and workpiece, but in most embodiments the lubricant advantageously is frozen on a surface of the workpiece and/or a surface of the tool.

Any appropriate liquid lubricant may be used; the liquid lubricant may be essentially water-free, or alternatively may contain water. A liquid lubricant is a lubricant that is liquid at temperatures in the range of about −40° C. to about +40° C. Oil-water emulsions may be used as lubricants in embodiments of the invention. Any commercially-available cutting oil or cutting fluid may be used to provide the lubricant. Exemplary liquid lubricants for use in embodiments of the present invention may include, for example, vegetable oils, mineral oils, and hydrocarbon-free lubricants such as those containing boric acid or hexagonal boron nitride. A hydrocarbon-free lubricant that may be used in embodiments of the invention is LuBoron™ sold by LuBoron LLC of Charlottesville, Va., USA.

Solid lubricants (for example, paraffin wax, pumpalbe greases, or other flowable but non-liquid materials) may be used instead of (or in addition to) liquid lubricants. A solid lubricant is a lubricant that is solid at ambient temperatures or below, e.g., below about 40° C.; some solid lubricants may remain solid at temperatures above 40° C. Solid lubricants typically are applied by pressing, rubbing, smearing, or otherwise directing the solid lubricant to contact the surface of a tool or workpiece and to penetrate and/or fill the microscopic regions formed by the surface asperities. The area of the surface to which the solid lubricant is applied may be cooled in the same manner as described above for liquid lubricants. In most embodiments, the solid lubricant is applied before the area is cooled.

The embodiments described above may be applied to exemplary shaping and forming processes including, for example, machining, turning, grinding, slitting, shearing, extruding, stamping, profiling, bending, drawing, drilling, punching, planing, tapping, sawing. Other shaping and forming processes not listed here also may be amenable to application of the embodiments of the present invention.

Any of the above processes may be used with embodiments of the invention to shape or form workpieces made of pure metals, metal alloys, non-metals, composite materials, plastics, refractory materials, ceramics, and other workable materials. A composite material is a combination or physical mixture containing two or more materials from the group consisting of pure metals, metal alloys, non-metals, plastics, refractory materials, and ceramics. A wide variety of materials can be shaped or formed using embodiments of the invention, but any material that is too soft or too hard for proper working by a selected process and tool material may not be amenable to the embodiments described here. Exemplary combinations of lubricants and cryogenic fluids according to embodiments of the invention may be applied advantageously to workpiece materials having a hardness of less than about 50 Rockwell C and more particularly less than about 35 Rockwell C. The shaping and forming of material in this hardness range is particularly amenable to the combined use of a lubricant and a cryogenic fluid.

In a series of experiments developing various embodiments of the invention, it was discovered that if the viscosity of the liquid lubricant applied to the tool surface is too high, the lubricant cannot penetrate fast enough to lubricate the microscopic regions formed by the surface asperities existing on the tool surface during the contact with the workpiece material. It is believed that this results in one or more of the following phenomena: (i) repeated brief seizures of the machining process, (ii) suffer releases of excessive heat at the tool/workpiece interface, and (iii) scoring of the workpiece surface. Each sudden seizure results in a temperature spike that reduces the viscosity of the lubricant, enabling it to refill the surface asperities again and restore a smooth machining process. Such an intermittent machining mode leads to an unacceptably short tool life and a poor quality surface on the workpiece. In an embodiment wherein a solid lubricant is pushed against the surface of a rotating tool, this lubricant viscosity problem does not occur because asperities on the tool surface cut into the lubricating solid at a microscopic level and the microscopic regions formed by the surface asperities become filled with the lubricant.

The wetting property of a liquid lubricant determines the ability of a liquid drop to spread on a substrate and fill the microscopic regions formed by the asperities on the surface. This is characterized by the wetting angle of a given lubricant on the surface of a given material. The smaller the wetting angle, the better the wettability. For example, a 0 degree wetting angle corresponds to complete wetting of the surface, whereas a 180 degree wetting angle corresponds to no wetting of the surface. For effective lubrication of the tool, the smallest wetting angle is desired. The degree of wetting depends on the substrate surface properties as well as the lubricant properties; a liquid that wets the surface of a WC-Co tool material for example, may not wet the surface of ceramic oxide, nitride, or diamond tool materials. For the selection of the lowest surface energy, therefore, low-viscosity oils are most desired in the cryo-microlubrication applications involving liquid-phase lubricants.

The wetting angles measured for conventional, water-based emulsion flood coolants vs. a low-viscosity straight lubricant show that the low-viscosity straight lubricant is more effective at wetting different tool material surfaces. This is shown in Table 2 for conventional emulsion coolants and a straight lubricant.

TABLE 2

Wetting Angles in Degrees for Oil-Water Emulsions and a Straight Lubricant on Tool Surfaces

| Tool → <br> Coolant or Lubricant ↓ | Polycrystalline diamond (PCD) | WC-Co |
|---|---|---|
| Hangsterfer's coolant (emulsion of 6% oil in water | 30 | 60 |

TABLE 2-continued

Wetting Angles in Degrees for Oil-Water Emulsions and a Straight Lubricant on Tool Surfaces

| Tool →<br>Coolant or Lubricant ↓ | Polycrystalline diamond (PCD) | WC-Co |
|---|---|---|
| Hangsterfer's coolant (emulsion of 12% oil in water | 60 | 90 |
| Coolube 2210 straight oil | 0 | 0 |

It was also observed that if the viscosity of a liquid-phase lubricant is sufficiently low, the machining process is expectedly smooth, but the tool tends to gradually heat up, which results in tool softening, loss of wear resistance, and shorter tool life or limited cutting speed. It was further observed that when a minimum amount of a low-viscosity lubricant is used (i.e., an amount sufficient to fill the microscopic regions formed by the asperities on the tool surface), and the toll is simultaneously cooled by a cryogenic fluid in such a way that the cryogen contacts the lubricant film on the tool surface only after the lubricant has penetrated the asperities of the tool surface, the machining process stays smooth and seizure-free throughout the entire shaping or forming operation. In addition, the life of the tool is enhanced, even if higher processing speeds are used than would be possible without the application of both minimum lubricant and cryogenic fluid.

The following Examples illustrate embodiments of the present invention but do not limit the invention to any of the specific details described therein.

EXAMPLE 1

A finish-turning pass is performed on a 5 inch diameter aluminum bar at a cutting speed of 4500 surface feet per minute (SFM), a feed rate of 0.010 inch/revolution, and a rotational speed of 3500 RPM. The initial roughness average Ra of the billet is 120 microinch (3 micrometer). A low-viscosity vegetable oil (Coolube 2210) is used to lubricate a cryogenically-cooled cutting tool using a flow rate such that the nominal thickness of the lubricant film on the work surface 0.1 times the initial roughness average Ra. The work surface area (S) production rate is calculated as $$S = \pi(d)(n)(f)$$

where d is the billet diameter in inches, n is the rotational speed in RPM, and f is the feed rate in inch/revolution. S is calculated as $$S = (3.14)(5)(3500)(0.01) = 550 \ in^2/min = 21.3 \ m^2/hr$$

The lubricant deposition percent efficiently is 50% and the fractional efficiently, e, is 0.5. The lubricant flow rate, q, is the work surface area production rate S times the nominal lubricant film thickness, t, divided by the fractional lubricant deposition efficiency, or $$q = (S\ t)/e = (21.3)(3)(0.1)/0.5 = 12.8 \ ml/hr$$

For a nominal thickness of the lubricant film on the work surface of 1.0 times the initial roughness average Ra, the lubricant flow rate is 128 ml/hr. For a nominal thickness of the lubricant film on the work surface of 10 times the initial roughness average Ra, the lubricant flow rate is 1280 ml/hr.

EXAMPLE 2

A 10 inch diameter billet of aluminum Al6061 was machined at a cutting speed of 5000 SFM, a feed rate of 0.010 inch/rev, and a depth of cut of 0.040 inch. A first section of the billet was machined using a conventional oil/water emulsion flood process using a 0.5 inch round conventional carbide tool insert. A second section of the billet was machined with a polycrystalline diamond tool using only liquid nitrogen jet cooling. A third section of the billet was machined using a polycrystalline diamond tool with a UNIST low viscosity vegetable oil mist (UNIST, Inc., Grand Rapids, Mich., USA) and a jet of liquid nitrogen applied to the billet.

Figure 6:
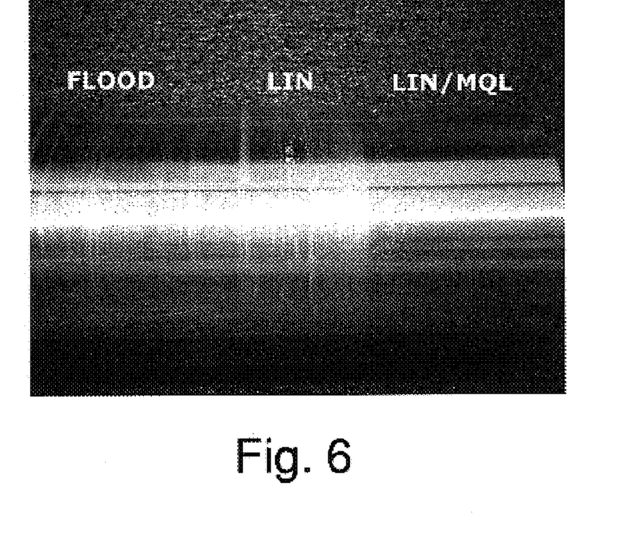
FIG. 6 is a photograph of a machined workpiece produced in Example 2.
Figure 7A:
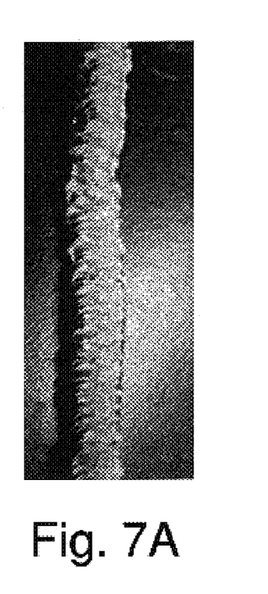
FIGS. 7A, 7B, and 7C are photographs of chips produced by machining in Example 2.
Figure 7B:
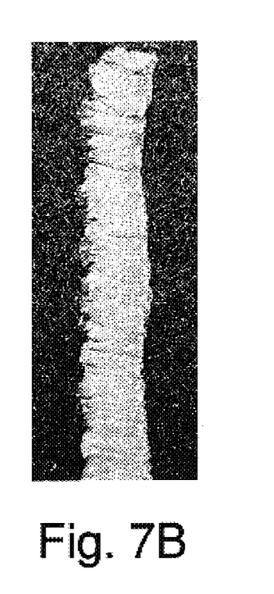
Figure 7C:
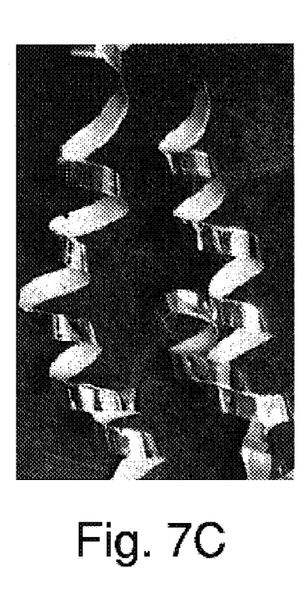

FIG. 6 is a photograph of the resulting machined workpiece showing the first, second, and third sections from left to right. The surface at the left, which was machined using a conventional oil/water emulsion flood using a carbide tool insert, shows scratch marks from the chips generated during machining. The middle surface, which was machined using liquid nitrogen cooling alone, shows significant smearing of the finished work surface due to the lack of lubrication. The surface at the right, which was machined using the polycrystalline diamond tool, a lubricant, and liquid nitrogen coolant was free of any material smearing and chip scratch marks. Photographs of the chips produced by machining of the left surface, middle surface, and right surface in FIG. 6 are shown in FIGS. 7A, 7B, and 7C, respectively. The advantageous results of the process using the low-viscosity lubricant combined with the cryogenic coolant also is illustrated by the appearance of the resulting close-coiled chips in FIG. 7C. There was no visible smearing on the work surface produced by this process (right surface, FIG. 6).

EXAMPLE 3

Surface grinding tests were carried out using a #60-grit $Al_2O_3$ grinding wheel, 7 inch diam.×½ inch thick, diamond dressed after each test grinding pass through an AlSl 1020 carbon steel workpiece bar, 4.5 inch long×½ inch thick, which was hot rolled and stress relieved at 550° C. in $H_2$ for uniformity and retaining flatness during grinding. The spindle rotational speed was 3450 rpm, and the table speed (feed rate) was 16.75 inch/minute; both settings were kept constant throughout the tests. After conversion, the surface speed was 10.2 m/s, and assuming a 0.001 inch (unit) grinding depth, the specific material removal rate was 0.180 $mm^2/s$. The following tests were carried out using the conditions described:

(1) dry in air with no cooling or lubrication;
(2) with tap water flood-cooling of the wheel and workpiece;
(3) with a single liquid nitrogen jet (6 lbs/min) directed at areas $5t$ and $5w$ (FIG. 5);
(4) with a paraffin lubrication stick pressed against the grinding wheel at a point about 270 degrees prior to wheel contact with the workpiece;
(5) with a paraffin lubricating stick pressed against the grinding wheel at a point about 270 degrees prior to wheel contact with the workpiece and a single liquid nitrogen jet (1.3 lbs/min) aimed at the leading edge of the grinding wheel contact with the workpiece and impinging on areas $5t$ and $5w$ (see FIG. 5);
(6) with (i) a paraffin lubricating stick pressed against the grinding wheel at a point about 270 degrees prior to wheel contact with the workpiece followed by (ii) a paraffin lubricating stick pressed against the grinding wheel at a point about 270 degrees prior to wheel contact with the workpiece and a single liquid nitrogen jet (1.3 lbs/min) aimed at the leading edge of the grinding wheel contact with the workpiece and impinging on areas 5t and 5w (see FIG. 5);

(7) a 2-nozzle UNIST misting unit in ambient air using a UNIST low viscosity vegetable oil mist (UNIST, Inc., Grand Rapids, Mich., USA) directed at areas 5t and 5w (see FIG. 5); and (8) a 2-nozzle UNIST misting unit in ambient air using a UNIST low viscosity vegetable oil mist (UNIST, Inc., Grand Rapids, Mich., USA) directed at areas 5t and 5w (see FIG. 5) with a single liquid nitrogen jet from a nozzle on ⅛ inch tubing at 1.2 lbs/min, where the liquid nitrogen nozzle was located between and slightly behind the two UNIST nozzles and was aimed at the leading edge of the grinding wheel contact with the workpiece.

The UNIST misting unit used here is one of many types of conventional minimum quantity lubricant (MQL) units available commercially for grinding and other metalworking applications.

Table 3 lists all conditions and results of these tests.

TABLE 3

Summary of Test Results for Example 3

| Test No. | Tool and workpiece surface | Limiting depth of grinding cut at first observation of burnmark on workpiece | Other |
|---|---|---|---|
| 1 | acceptable only below grinding cut depth of 0.0005 inch (0.0127 mm) | 0.0010 inch (0.0254 mm) | oxidized, dusty chips, sparks |
| 2 | acceptable only below grinding cut depth of 0.0070 inch (0.1778 mm) | 0.0070 inch (0.1778 mm) | powdery chips, splash, rapid corrosion of ground surface |
| 3 | acceptable only below grinding cut depth of 0.0040 inch (0.1016 mm) | 0.0040 inch (0.1016 mm) | powdery chips |
| 4 | melts, sputters, infiltrates wheel pores | unacceptable across entire range | unacceptable burning smell, dark clouding |
| 5 | buildup of frozen paraffin film on grinding wheel | >0.0050 inch (>0.1270 mm); no burnmarks | clean, cosmetic process; powdery chips |
| 6 | deep infiltration of paraffin into wheel | >0.0040 inch (>0.1016 mm); no burnmarks | hot paraffin smell; powdery chips |
| 7 | acceptable only below grinding cut depth of 0.0030 inch (0.0762 mm) | 0.0030 inch (0.0762 mm); intense burning spot | heavy, dark clouds of oil aerosol, smell of burning oil, sparks, large/spongy metal swarf |
| 8 | acceptable only below grinding cut depth of 0.0050 inch (0.1270 mm) | 0.0050 inch (0.1270 mm) | insignificant oil aerosol, no smoke cloud, no smell of burning oil, no sparks, better sticking of oil drops to workpiece and wheel; curly metal chips |

What is claimed is:

1. A method of processing a workpiece comprising
    (a) providing a tool and a workpiece, wherein the workpiece has an initial shape;
    (b) placing the workpiece and the tool in contact to form an interface, applying force to the tool and/or the workpiece, and moving the tool and/or the workpiece to effect a change in the initial shape of the workpiece;
    (c) applying a lubricant to any area on a surface of the tool and/or to any area on a surface of the workpiece while the workpiece and the tool are in contact; and
    (d) applying a cryogenic fluid in any area on the surface of the tool and/or to any area on the surface of the workpiece while the workpiece and the tool are in contact,
    wherein any area to which the lubricant is applied is not contiguous with or overlapping with any area to which the cryogenic fluid is applied.

2. The method of claim 1 wherein the lubricant is a liquid and the lubricant is applied to at least a portion of a selected area on the workpiece.

3. The method of claim 1 wherein the cryogenic fluid is selected from the group consisting of nitrogen, argon, carbon dioxide, and mixtures thereof.

4. The method of claim 1 wherein the lubricant is a liquid lubricant and comprises one or more components selected from the group consisting of vegetable oils, mineral oils, and hydrocarbon-free lubricants.

5. The method of claim 4 wherein the surface of the workpiece prior to contact with the tool is characterized by an initial value of a roughness average Ra, and the lubricant is applied to the workpiece in a layer having an equivalent thickness of between about 0.1 and about 10 times the initial value of the roughness average Ra, inclusive.

6. The method of claim 4 wherein the lubricant has a viscosity of less than about 40 Cst at 40° C.

7. The method of claim 1 wherein the workpiece comprises metal and has a hardness of less than about 50 Rockwell C.

8. The method of claim 1 wherein the workpiece comprises a material selected from the group consisting of composite materials, plastics, refractory materials, and ceramics.

9. The method of claim 1 wherein the method of processing the workpiece is selected from shaping and forming processes in the group consisting of machining, turning, grinding, slitting, shearing, extruding, stamping, profiling, bending, drawing, drilling, punching, planing, tapping, and sawing.

10. A method of processing a workpiece comprising
   (a) providing a tool and a workpiece, wherein the workpiece has an initial shape;
   (b) placing the workpiece and the tool in contact to form an interface, applying force to the tool and/or the workpiece, and moving the tool and/or the workpiece to effect a change in the initial shape of the workpiece;
   (c) applying a lubricant to any area on a surface of the tool and/or to any area on a surface of the workpiece while the workpiece and the tool are in contact; and
   (d) applying a cryogenic fluid to any area on the surface of the tool and/or to any area on the surface of the workpiece while the workpiece and the tool are in contact,
   wherein the lubricant is applied to at least a portion of an area during a time period, and, prior to or subsequent to the time period, the cryogenic fluid is applied to at least a portion of that area.

11. The method of claim 10 wherein the surface of the workpiece prior to contact with the tool is characterized by an initial value of a roughness average Ra and the lubricant is applied to the workpiece in a layer having an equivalent thickness of between about 0.1 and about 10 times the initial value of the roughness average Ra, inclusive.

12. The method of claim 10 wherein the lubricant has a viscosity of less than about 20 Cst at 40° C.

13. The method of claim 10 wherein the workpiece comprises metal and has a hardness of less than about 35 Rockwell C.

14. A method of processing a workpiece comprising
   (a) providing a tool and a workpiece, wherein the workpiece has an initial shape;
   (b) placing the workpiece and the tool in contact to form an interface, applying force to the tool and/or the workpiece, and moving the tool and/or the workpiece to effect a change in the initial shape of the workpiece;
   (c) applying a lubricant to any area on a surface of the tool and/or to any area on a surface of the workpiece while the workpiece and the tool are in contact; and
   (d) applying a cryogenic fluid to any area on the surface of the tool and/or to any area on the surface of the workpiece while the workpiece and the tool are in contact,
   wherein the interface is characterized by a leading edge of the tool at which initial contact is made between the tool and the workpiece and by a trailing edge of the tool at which contact between the tool and the workpiece is terminated, further wherein
   (a) the workpiece is characterized by a first workpiece area adjacent the leading edge of the tool, a second workpiece area adjacent the trailing edge of the tool, a third workpiece area adjacent the first area, and a fourth workpiece area adjacent the second workpiece area, and
   (b) the tool is characterized by a first tool area adjacent the leading edge of the tool, a second tool area adjacent the trailing edge of the tool, and any area of the tool other than the first and second tool areas, and
   wherein
   (1) the lubricant is applied to the first tool area, and the cryogenic fluid is applied to any area on the tool other than the first and second tool areas; or
   (2) the lubricant is applied to the first workpiece area, and the cryogenic fluid is applied to any area on the tool other than the first and second tool areas; or
   (3) the lubricant is applied to the first workpiece area and the first tool area, and the cryogenic fluid is applied to the second workpiece area and to any area on the tool other than the first and second tool areas; or
   (4) the lubricant is applied to the first workpiece area and the first tool area, and the cryogenic fluid is applied to the third workpiece area; or
   (5) the lubricant is applied to the first and second tool areas and to the first and second workpiece areas, and the cryogenic fluid is applied to any area on the tool other than the first and second tool areas; or
   (6) the lubricant is applied to the third workpiece area, and the cryogenic fluid is applied to the first tool area and to any area on the tool other than the first and second tool area; or
   (7) the lubricant is applied to any area on the tool other than the first and second tool areas, and the cryogenic fluid is applied to the first and second tool areas and to the first and second workpiece areas; or
   (8) the lubricant is applied to the third workpiece area, and the cryogenic fluid is applied to the first tool area and to the first workpiece area.

15. The method of claim 14 wherein the lubricant is a solid lubricant and is selected from the group consisting of paraffin wax, pumpable greases, and flowable non-liquid materials.

16. The method of claim 15 wherein the lubricant is applied to any area on the tool other than the first and second tool areas, and the cryogenic fluid is applied to the first and second tool areas and to the first and second workpiece areas.

17. The method of claim 15 wherein the lubricant is applied to the workpiece in a layer having an equivalent thickness of between about 0.1 and about 10 times the initial value of the roughness average Ra, inclusive.

18. A method of processing a workpiece comprising
   (a) providing a tool and a workpiece, wherein the workpiece has an initial shape and is characterized by an initial value of a roughness average Ra;
   (b) placing the workpiece and the tool in contact to form an interface, applying force to the tool and/or the workpiece, and moving the tool and/or the workpiece to effect a change in the initial shape of the workpiece;
   (c) applying a liquid lubricant to any area on a surface of the workpiece while the workpiece and the tool are in contact, wherein the lubricant is applied to the workpiece in a layer having an equivalent thickness of between about 0.1 and about 10 times the initial value of the roughness average Ra, inclusive; and
   (d) applying a cryogenic fluid to any area on the surface of the tool and/or to any area on the surface of the workpiece while the workpiece and the tool are in contact.

19. The method of claim 18 wherein the lubricant is a liquid lubricant and comprises one or more components selected from the group consisting of vegetable oils, mineral oils, and hydrocarbon-free lubricants.

20. The method of claim 19 wherein the lubricant has a viscosity of less than about 40 Cst at 40° C.

21. The method of claim 19 wherein the lubricant has a viscosity of less than about 20 Cst at 40° C.

22. An apparatus for processing a workpiece comprising
   (a) a tool and a workpiece, wherein the workpiece has an initial shape;
   (b) means for placing the workpiece and the tool in contact to form an interface, means for applying force to the tool and/or the workpiece, and means for moving the tool and/or the workpiece to effect a change in the initial shape of the workpiece;

(c) a lubricant application system adapted for applying a lubricant to any area on a surface of the tool and/or to any area on a surface of the workpiece while the workpiece and the tool are in contact; and (d) a cryogenic fluid application system adapted for applying a cryogenic fluid to any area on the surface of the tool and/or to any area on the surface of the workpiece while the workpiece and the tool are in contact, wherein any area to which the lubricant is applied is not contiguous with or overlapping with any area to which the cryogenic fluid is applied.

23. The apparatus of claim 22 selected from shaping and forming systems in the group consisting of machining, turning, grinding, slitting, shearing, extruding, stamping, profiling, bending, drawing, drilling, punching, planing, tapping, and sawing.

* * * * *

UNITED STATES PATENT AND TRADEMARK OFFICE
CERTIFICATE OF CORRECTION

PATENT NO.         : 7,390,240 B2
APPLICATION NO.    : 11/250587
DATED              : June 24, 2008
INVENTOR(S)        : Ranajit Ghosh and Zbigniew Zurecki Page 1 of 1

It is certified that error appears in the above-identified patent and that said Letters Patent is hereby corrected as shown below:

Column 16, Line 16

In claim 14 delete the word "area;" and insert the word -- areas; --

Signed and Sealed this

Twelfth Day of August, 2008

JON W. DUDAS
*Director of the United States Patent and Trademark Office*